US008689678B2

(12) United States Patent
Eustis (10) Patent No.: US 8,689,678 B2
(45) Date of Patent: Apr. 8, 2014

(54) APPARATUS FOR AGING WINE OR SPIRITS (76) Inventor: Robert H. Eustis, Stanford, CA (US)

( * ) Notice: Subject to any disclaimer, the term of this patent is extended or adjusted under 35 U.S.C. 154(b) by 0 days.

(21) Appl. No.: 12/844,806

(22) Filed: Jul. 27, 2010

(65) Prior Publication Data

US 2010/0288130 A1 Nov. 18, 2010

Related U.S. Application Data

(63) Continuation-in-part of application No. 11/856,893, filed on Sep. 18, 2007, now Pat. No. 7,762,179, which is a continuation-in-part of application No. 11/284,673, filed on Nov. 21, 2005, now abandoned, which is a continuation of application No. 10/265,016, filed on Oct. 3, 2002, now Pat. No. 6,966,250.

(60) Provisional application No. 60/327,683, filed on Mar. 10, 2002.

(51) Int. Cl.
*C12G 3/06* (2006.01)
*B65D 88/00* (2006.01)
*B65D 8/00* (2006.01)

(52) U.S. Cl.
USPC .................................. 99/277.1; 217/4; 217/72

(58) Field of Classification Search
USPC ........... 99/277.1, 277.2; 217/88, 76, 72, 79, 4
See application file for complete search history.

(56) References Cited

U.S. PATENT DOCUMENTS

| 57,009 | A | | 8/1866 | Storm | |
|---|---|---|---|---|---|
| 85,225 | A | | 12/1868 | Gibson | |
| 418,792 | A | | 1/1890 | Hasbrouck | |
| 697,579 | A | | 4/1902 | Wehmeier | |
| 2,017,235 | A | | 10/1935 | Drew | |
| 2,084,056 | A | * | 6/1937 | Costello | ............................ 215/2 |
| 2,088,337 | A | | 7/1937 | Plume | |
| 2,018,661 | A | | 2/1938 | Farrier | |
| 2,114,009 | A | | 4/1938 | Ramsay | |
| 2,203,229 | A | | 6/1940 | Nilsson | |
| 3,106,885 | A | * | 10/1963 | Kelley | ......................... 99/277.1 |
| 3,119,321 | A | | 1/1964 | Deal | |

(Continued)

FOREIGN PATENT DOCUMENTS

JP 63044879 2/1988

OTHER PUBLICATIONS

Information Disclosure Statement filed Jan. 21, 2003 in U.S. Appl. No. 10/265,016.

(Continued)

*Primary Examiner* — Reginald L Alexander
(74) *Attorney, Agent, or Firm* — Meyer & Associates, LLC; Lee G. Meyer, Esq.

(57) ABSTRACT

A device for the non-deleterious, passive aging of wine wherein the interior of the semi-permeable wall of the aging container, which provides the interface between the wine and the atmosphere, has a substantially larger interface area per unit volume of wine than does that of the prior art device. The device employs a polyhedron shaped aging container or vessel having a volumetric capacity of greater than 30 gallons; and, a relationship (ratio) of the interior surface area of the container to the volume of the container from 0.33 square inches to 1.0 cubic inch to 4.0 square inches to 1.0 cubic inch. In one advantageous embodiment, the container is a rectangular hexahedron. In another advantageous embodiment, the container is a trapezoidal hexahedron.

16 Claims, 4 Drawing Sheets

(56) References Cited

U.S. PATENT DOCUMENTS

| | | | | |
|---|---|---|---|---|
| 3,456,827 A | * | 7/1969 | Wakeem | 217/72 |
| 3,462,038 A | * | 8/1969 | Morris | 217/72 |
| 3,942,423 A | | 3/1976 | Herzfeld | |
| 4,073,955 A | | 2/1978 | Koppelman | |
| 4,432,463 A | * | 2/1984 | MacDonald et al. | 217/12 R |
| 4,484,688 A | * | 11/1984 | Smith | 217/91 |
| 4,817,510 A | | 4/1989 | Kowalics | |
| 4,953,730 A | * | 9/1990 | Prime et al. | 217/4 |
| 5,537,913 A | | 7/1996 | Vowles | |
| 5,647,268 A | | 7/1997 | Sullivan | |
| 6,041,954 A | * | 3/2000 | Savioz | 217/4 |
| 6,378,419 B1 | | 4/2002 | Ecklein | |
| 6,966,250 B2 | | 11/2005 | Eustis | |

OTHER PUBLICATIONS

Non-Final Rejection issued Apr. 5, 2004 in U.S. Appl. No. 10/265,016.
Response After Non-Final Action filed Jul. 19, 2004 in U.S. Appl. No. 10/265,016.
Final Rejection issued Sep. 16, 2004 in U.S. Appl. No. 10/265,016.
Amendment After Final Rejection filed Nov. 1, 2004 in U.S. Appl. No. 10/265,016.
Notice of Allowance issued Mar. 17, 2005 in U.S. Appl. No. 10/265,016.
Non-Final Rejection issued Jun. 19, 2008 in U.S. Appl. No. 11/284,673.
Response After Non-Final Action filed Aug. 12, 2008 in U.S. Appl. No. 11/284,673.
Requirement for Restriction/Election issued Oct. 4, 2008 in U.S. Appl. No. 11/284,673.
Response to Election/Restriction filed Oct. 20, 2008 in U.S. Appl. No. 11/284,673.
Final Rejection issued Dec. 10, 2008 in U.S. Appl. No. 11/284,673.
Information Disclosure Statement filed Sep. 21, 2007 in U.S. Appl. No. 11/856,893.
Non-Final Rejection issued Sep. 11, 2008 in U.S. Appl. No. 11/856,893.
Response After Non-Final Action filed Dec. 30, 2008 in U.S. Appl. No. 11/856,893.
Final Rejection issued Feb. 27, 2009 in U.S. Appl. No. 11/856,893.
Amendment After Final Rejection filed Mar. 17, 2009 in U.S. Appl. No. 11/856,893.
Advisory Action issued Mar. 26, 2009 in U.S. Appl. No. 11/856,893.
Request for Continued Examination filed Apr. 24, 2009 in U.S. Appl. No. 11/856,893.
Non-Final Rejection issued May 20, 2009 in U.S. Appl. No. 11/856,893.
Response After Non-Final Action filed Jun. 9, 2009 in U.S. Appl. No. 11/856,893.
Final Rejection issued Aug. 31, 2009 in U.S. Appl. No. 11/856,893.
Amendment After Final Rejection filed Nov. 3, 2009 in U.S. Appl. No. 11/856,893.
Advisory Action issued Nov. 10, 2009 in U.S. Appl. No. 11/856,893.
Notice of Appeal and Amendment After Final Rejection filed Mar. 1, 2010 in U.S. Appl. No. 11/856,893.
Notice of Allowance issued Mar. 23, 2010 in U.S. Appl. No. 11/856,893.
Issue Notification issued Jul. 7, 2010 in U.S. Appl. No. 11/856,893.

* cited by examiner

APPARATUS FOR AGING WINE OR SPIRITS

CROSS-REFERENCE TO RELATED APPLICATIONS

This application is a continuation-in-part application of U.S. patent application Ser. No. 11/856,893 for System For Non-Deleterious Accelerated Aging of Wine or Spirits filed on Sep. 18, 2007, now U.S. Pat. No. 7,762,179, issued Jul. 27, 2010, which is a continuation-in-part application of U.S. patent application Ser. No. 11/284,673 for Apparatus and Method for Aging Wine or Spirits filed on Nov. 21, 2005, now abandoned, which is a continuation of U.S. patent application Ser. No. 10/265,016 for Apparatus and Method for Aging Wine or Spirits filed Oct. 3, 2002, now U.S. Pat. No. 6,966,250, issued Nov. 22, 2005, which claims the benefit of and priority to U.S. Provisional Patent Application Ser. No. 60/327,683 filed Oct. 4, 2001.

BACKGROUND

The Apparatus relates generally to non-deleterious accelerated aging of wine and/or spirits. In earlier days, wine making was practiced in very low volume by a few masters who handed the craft from generation to generation. Recently, however, the wine business has burgeoned into a multimillion dollar industry which stretches around the world. Relatively new vineyards, such as Napa Valley and Australia, have joined the traditional ranks of those in Italy, France, Spain, Portugal, and the like. Even though, the demand for this commodity has increased multifold, the process by which the wine is made has remained pretty much the same. Thus, wineries have been forced to increase such things as vat volume, aging capacity, and the like. A prime limiting factor in further increasing production is the "aging time" which increases the time in inventory, thus increasing costs. Another factor is the expense of increasing the number of traditional wine barrels required to increase production.

In the making of many wines and spirits, it is usual to age the wine or spirits in, for example, wooden barrels. "Barrel aging" is a centuries-old practice to improve the characteristics, such as taste and mellowness of wine. Certain aging techniques are used to impart a flavor and "soften" the wine. Usually, for quality wines, the barrels are made of oak. One of the drawbacks of "barrel aging" is the time that it takes to naturally age the fermented beverage. In recent years, synthetic barrels made of materials having limited porosity (semi-permeable) have been used and oak wood chips added for flavor. Additionally, stainless steel vats have been used wherein aging is accomplished by micro-oxygenation. In micro-oxygenation, small bubbles of oxygen are passed through the wine. Wines, aged in this manner, are usually of less quality and can be over-oxygenated, spoiling the wine.

The aging process, although complex, is thought to involve oxygen induced chemical reactions, including polymerization of short chain phenols. After the initial fermentation, present understanding suggests that the aging process improves the wine by polymerization of these phenols with the involvement of oxygen. Thus, it is known that the infusion of oxygen through the walls of the barrel or semi-permeable container into the wine or spirits is an important aspect of the aging process. During this barrel aging process, water and alcohol are thought to diffuse out through the semi-permeable walls of the barrel and oxygen from the atmosphere diffuses in.

In the usual practice of aging wine in barrels, or in wine aging containers, the barrels or containers are placed in racks undisturbed (except for periodic sampling or topping off as evaporation of the water and alcohol depletes the liquid.) In some wineries, the barrels are turned to provide some agitation or mixing of the body of the wine. This has little effect on the convection into the reaction region, but favorably affects the diffusion profiles of the reactants in the aging process. Because the effect on aging rate is small and the effort is large, the turning of barrels is not done by many winemakers.

While exposure to oxygen during racking and aging in the barrel can be of benefit to the wine, excess oxygen can be deleterious and "sour" the wine. Thus, wines that are "corked" or have "turned" are examples of excess oxidation. Once a bottle of wine has been opened for some time, or if oxygen has seeped past a faulty cork, the oxidized wine will taste "off" and eventually sour. Therefore, accelerating aging by introduction of more oxygen has to be controlled to prevent deleterious excessive oxidation.

Therefore, it would be advantageous to have an apparatus or device for accelerating the time that it takes to age wine without deleteriously affecting the wine. In my parent application (Ser. No. 11/856,893, which is incorporated herein by reference) of which this application is a continuation-in-part, apparatus and methods were disclosed, for induced or "active" acceleration of the aging of wine by moving the wine within the container. In that application, it was disclosed that the aging as a chemical reaction occurs in a region near the interface of the inner container wall and the wine, called the "Reaction Region." As a result, a concentration gradient of the products builds near the barrel wall which inhibits fresh wine reaching the reaction region. Thus, the rate of reaction (aging) is thought to be dependent on the concentration of the reactants at the reaction region. That application involved replenishing of fresh wine in the reaction region by active mechanical means, such as an impeller, for moving the wine interior the container. This process had traditionally been accomplished primarily by passive naturally occurring diffusion or natural convection within the standard wine barrel.

In my grandparent application (now U.S. Pat. No. 6,966,250, which is incorporated herein by reference), of which the parent application, as well as the instant application, are continuations-in-part, an apparatus and method were disclosed, for induced acceleration of the aging of wine by increasing the area of the interface between the wine and the atmosphere, wherein the rate of aging is expedited by increasing the volume of air within the area of wine interface by providing additional semi-permeable interface within the container. This interface area was disclosed as being increased well above that of conventional barrels by a number of apparatuses and techniques, all of which involved the introduction of additional apparatus into the container to carry air and/or the wine.

In that grandparent application, there were disclosed a number of methods and devices, for increasing the oxygen interface to volume ratio. In one embodiment, a plurality of spaced hollow semi-permeable tubes provided an interface wall between the wine and the atmosphere wherein the tubes were placed within the barrel such that oxygen could infuse through the walls of the tube into the wine or spirits to enhance aging.

Although, these active methods of increasing the ratio of this interface area (reaction region) to the volume of wine in the container proved effective in decreasing aging time, they greatly increased the cost of both the apparatus and the aging operation. In addition, such configurations are difficult to clean. However, the problem of "aging time" with purely passive methods is still problematic.

Thus, it would be advantageous to have a device for aging wine which was passive, i.e. did not require mechanical impellers or semi-permeable tubes through which oxygen (air) is delivered, thus accelerating the aging, while retaining the traditional costs of materials and operations of the time-honored wine making masters. These devices would be liquid tight semi-permeable containers which, for a given volume of wine, would allow for a faster non-deleterious softening (or aging) of the wine along with the economic advantages over prior art "barrel aging".

SUMMARY

There is provided a device for the non-deleterious, passive aging of Wine, wherein the interior of the semi-permeable wall of the Aging Container, which provides the interface between the Wine and the atmosphere, has a substantially larger interface area per unit volume of Wine than does that of the prior art device. The reaction region is increased per unit volume of Wine by configuring the Aging Container such that the interior of the Aging Container presents a larger surface area to a specific volume of contained Wine than the traditional barrel configuration. These containers are of configurations far removed from the old stave barrel, and are relatively narrow in one or more dimensions so that the bulk of the Wine is near an interior surface through which the oxygen from the air diffuses.

In the broad aspect, an Aging Container for the passive, non-deleterious acceleration of the Wine aging process has a volumetric capacity of greater than 30 gallons; and, relationship (ratio) of the interior surface area of the container to the volume of the container from 0.33 square inches to 1.0 cubic inch to about 4.0 square inches to 1.0 cubic inch. In one aspect, the container is a polyhedron. In one advantageous embodiment, the container is a rectangular hexahedron. In another advantageous embodiment the container is a trapezoidal hexahedron.

In a further aspect, the Aging Container can comprise a stand alone unit or may be ganged in a spaced apart relationship. Containers can also be stand alone or supported on racks. Stability of the stand alone container can be enhanced by using a trapezoidal shape or an exterior frame which supports the container. In another advantageous embodiment, at least one face of the polyhedron is corrugated to increase interior surface area, as well as provide further stability to the container.

BRIEF DESCRIPTION OF THE DRAWINGS

The invention will be more clearly understood and appreciated from the following description when read in conjunction with the accompanying drawings in which.

DISCUSSION OF NOMENCLATURE

"Aging Container" shall mean a semi-permeable closed container for Wine used to accomplish the aging process which is not necessarily constructed of wood.

"Polyhedron" shall mean a geometric solid figure with flat faces and straight edges consisting of four or more plane faces (all polygons), pairs of which meet along an edge, and three or more edges meeting at a vertex.

"Reaction Region" shall mean the interface of the Wine and the interior surface of the Aging Container in which the Wine is held.

"Surface area-to-volume relationship (ratio)" of the Aging Container shall mean the total interior surface area of the Aging Container divided by the volume of the Aging Container.

"Wine" shall mean wine and related spirits which undergo aging.

DETAILED DESCRIPTION OF EXEMPLARY EMBODIMENTS

Disclosed is a device for enhancing the aging time of Wine by passive means, i.e. no external forces or additions are made to or during the aging process, using uniquely shaped Aging Containers which increase the relationship of interior surface area of the Aging Container to a specific volume of Wine over that of prior art Aging Containers, thus increasing the area of the Reaction Region and decreasing the amount of time required for achieving the same level of aging.

Basically, the Aging Container is considered as a chemical reactor. The aging of Wine is a process which is related to the area of the interface between the Wine and the atmosphere and the amount of Wine that is available to interact with permeated oxygen at the participating area of the interface (Reaction Region) at the interior of the semi-permeable wall or boundary of the container. The rate of aging is expedited by increasing the Reaction Region by increasing the interior surface area of the Aging Container for a specific volume of Wine. In accordance with the present device, the relationship between the interior surface of the Aging Container and the volume of Wine in the Aging Container is increased over prior art configurations, thus passively accelerating the aging process and decreasing the aging time.

The configurations of the present device provide for an air-permeable, planar container wall separating the Wine from the air, forming, there between, the Reaction Region. The container walls are made of semi-permeable material such as oak, wood or other suitable (food grade) semi-permeable material which allows for the infusion of oxygen from the atmosphere through the walls of the container to interact with the Wine in the Reaction Region It should be understood that the oxygen source need not be solely atmospheric, but can be other compatible gas mixtures which contain oxygen.

A conventional, semi-permeable, staved oak barrel, having a top and bottom end, suitably sealed to the walls, for example, has a fixed volume and interior surface area through which air can permeate. A typical 59-gallon Bordeaux barrel, for example, has a belly diameter of about 27.5 inches and a contact area of about 20 square feet. A diffusion of oxygen calculation for Wine in conventional aging shows that in six months a layer of only two inches is significantly affected.

The polyhedron shaped construction with planar faces of the instant Aging Container, as contrasted with barrel staves, allows for cheaper manufacturing and closer packing with more efficient use of space in the aging facility (winery). Since the surface area to volume relationship is inversely proportional to the volume of a given solid vessel, enlarging conventional wine barrels actually increases the aging time. Thus, the instant Aging Container configurations allow efficiency by allowing Aging Containers with large wine volumes while maintaining close proximity of the bulk of the Wine to an oxygen supplying surface. This enhances the aging process and reduces aging time. For example, large volume rectangular hexahedron shaped Aging Containers have advantages as aging vessels over cylindrical tanks. Specific examples of dimensions for rectangular hexahedral Aging Containers are given below:

| Volume, gallons | Dimensions (internal) |
| --- | --- |
| 60 | 8" × 36" × 48" (inches) |
| 100 | 8" × 48" × 60" (inches) |
| 1000 | 2' × 4' × 17' (feet) |

Rectangular hexahedron shaped Aging Containers set forth above have rectangular cross sections, and represent a radical departure from the aging characteristics of "barrels" of like volume.

It will be appreciated by the skilled artisan that a number of semi-permeable materials are available for the construction of the instant Aging Containers. The diffusion rate of oxygen through the staves of an oak barrel is slow, so it is advantageous to decrease the "oak barrel stave" thickness or use a container made of a polymer or sintered ceramics or stainless steel of controlled diffusivity. However, as semi-permeable wall thicknesses become thin and volumes increase, the structural stability of the Aging Container diminishes. In some instances, as will be more specifically described below, external frames or "exoskeleton" type meshes or lattices may be required to help with stability. It will be appreciated that any such support must be placed, so as not to greatly impede the airflow through the semi-permeable wall of the Aging Container.

Figure 5:
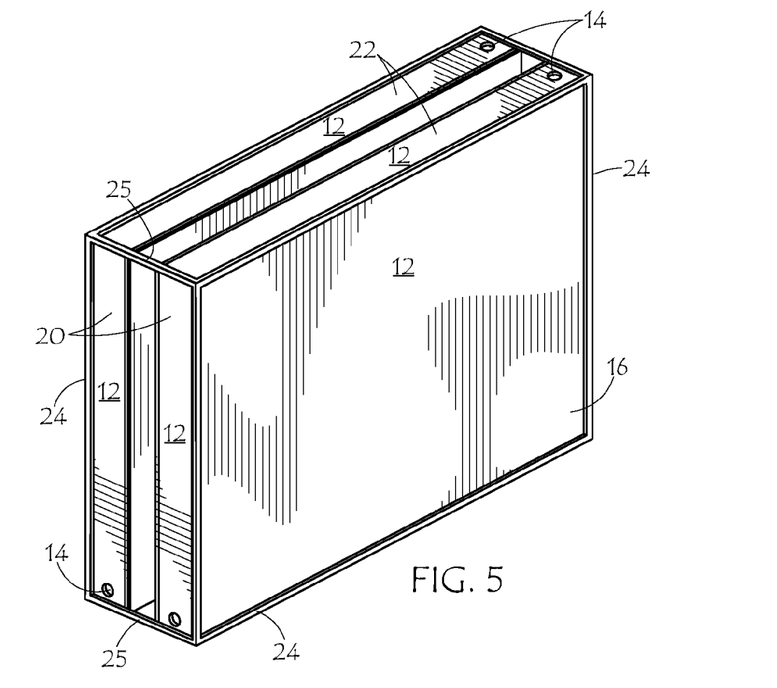
FIG. 5 is a perspective view of a two rectangular hexahedron shaped wine Aging Containers of FIG. 1 ganged in a side by side relationship with a support frame.
Figure 9:
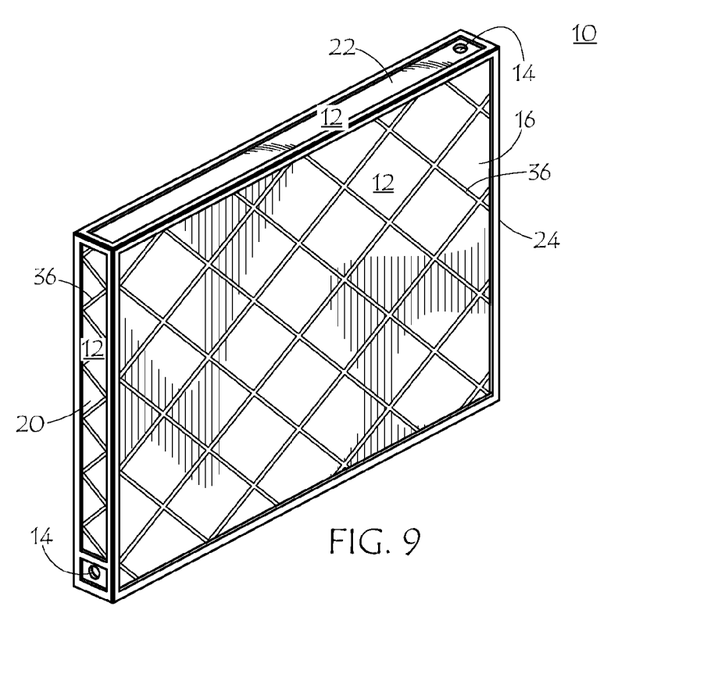
FIG. 9 is a perspective view of a rectangular hexahedron shaped wine Aging Container having a crisscross lattice structural restraint.

In accordance with one aspect, a frame of plastic, wood, or metal is used to support a large volume Aging Container to prevent bulging and collapsing. Many frame structures are available. The frame structure set forth in FIG. 5 is exemplary and, in addition, allows rectangular hexahedron Aging Containers to be placed in a side-by-side gang relationship, as shown, wherein the surface of the first Aging Container, proximate the second Aging Container in the gang, is spaced apart from the like surface of the second Aging Container in order to allow free, uninhibited flow of air there between. Other structural supports to enhance the integrity and shape of large volume Aging Containers may employ a lattice cross-sectional "mesh type" support, as shown in FIG. 9. It would be understood by the skilled artisan that the cross-sections need to provide sufficient area so as not to impede the exposure of the exterior planar surface of the Aging Container to the atmosphere.

Thus, rectangular hexahedron shaped Aging Containers, especially those where every side has a rectangular cross-section, have at least one top or bottom side, which is substantially narrower in width, making the placing of these devices on planar shelving somewhat difficult due to their inherent instability. In this regard, gangs of these large volume Aging Containers need to be supported in structural lattice frame works which can be, for example, many Aging Containers high and many Aging Containers wide, so long as sufficient spacing is maintained between Aging Containers to allow free flow of air.

Figure 6:
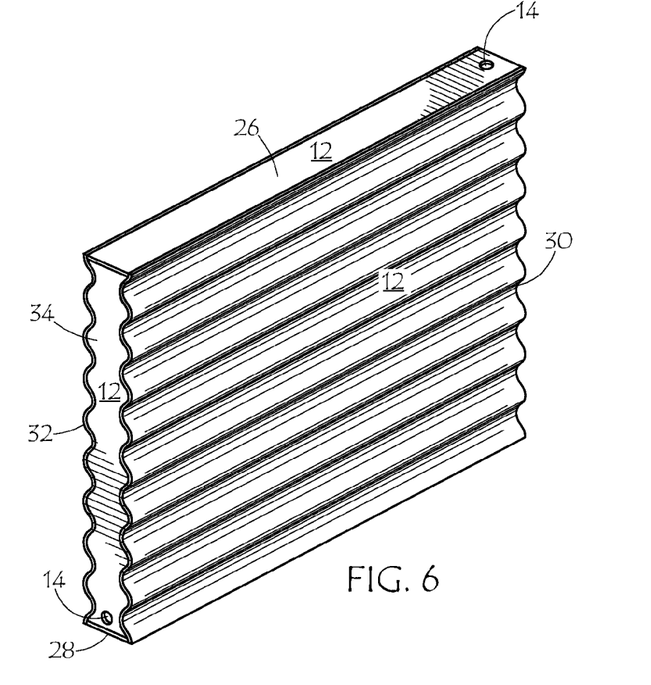
FIG. 6 is a perspective view of a rectangular hexahedron shaped wine Aging Container having two corrugated sides.

In another aspect, the Aging Containers of the instant application can employ one or more corrugated planes as is shown in FIG. 6. The use of corrugated planes or sides not only increases the structural stability of the Aging Container, but also increases the surface area. It will be appreciated that corrugations may run horizontally, vertically, or diagonally, as the particular application requires.

Figure 12:
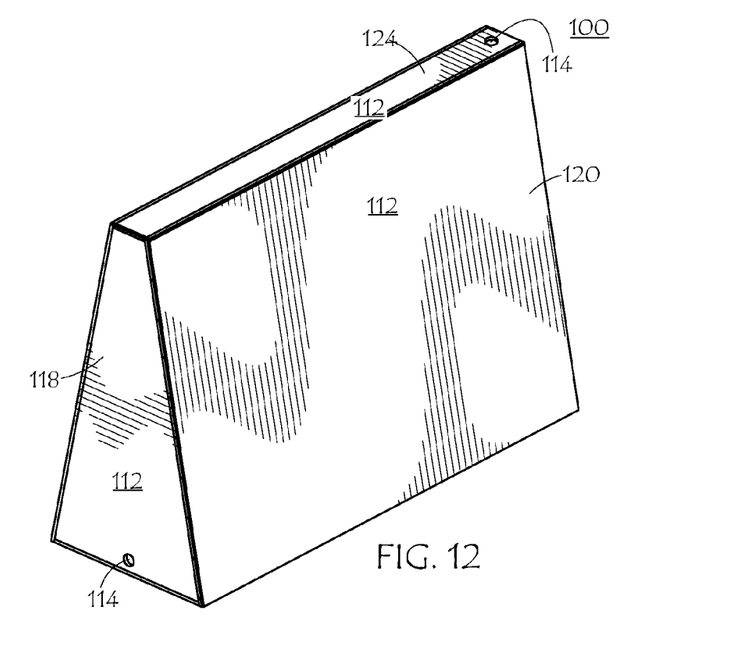
FIG. 12 is a perspective view of a trapezoidal hexahedron shaped wine Aging Container.

In another embodiment, the poly-hexahedral shape can also be varied to affect a more structurally stable Aging Container, while maintaining a desirable relationship between the interior surface area and the volume of the vessel. One such shape is a trapezoid wherein one possible configuration is shown in FIG. 12. In accordance with this trapezoidal hexahedron Aging Container, the bottom rectangular plane has a greater width dimension than the top which allows the Aging Container to be placed on a support rack, while maintaining acceptable vertical stability.

It will be realized by the skilled artisan that a number of poly-hexahedron shaped Aging Containers, which meet the volumetric and interior surface area to volume relationship of the instant passive Aging Containers, are available, for example, pyramids. However, the most practical polyhedron shaped Aging Containers appear to be the rectangular hexahedrons.

Figure 1:
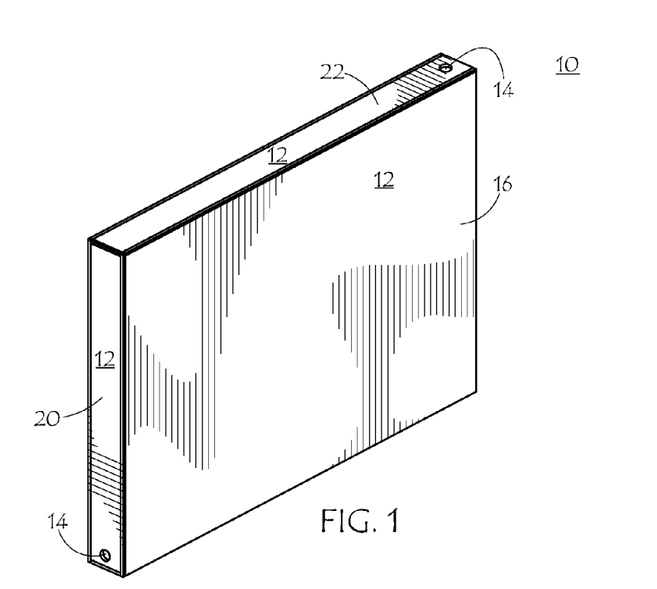
FIG. 1 is a perspective view of a rectangular hexahedron shaped wine Aging Container.
Figure 2:
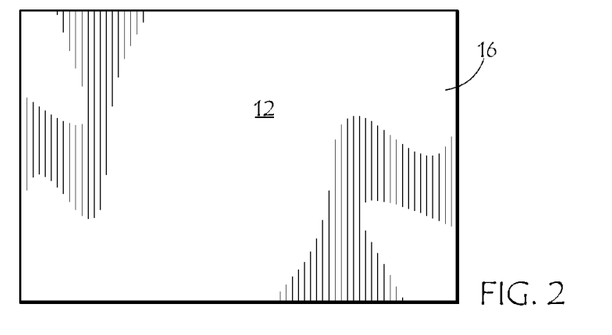
FIG. 2 is a front elevational view of a rectangular hexahedron shaped wine Aging Container of FIG. 1.
Figure 3:
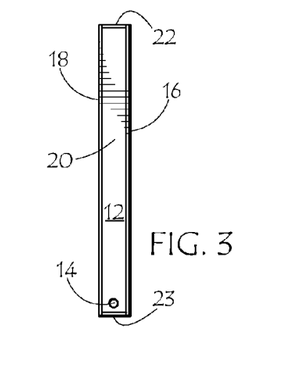
FIG. 3 is a side elevational view of the rectangular hexahedron shaped wine Aging Container of FIG. 1.
Figure 4:
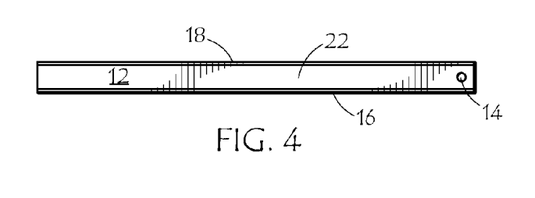
FIG. 4 is a top plan view of the a rectangular hexahedron shaped wine Aging Container of FIG. 1.

Turning to the figures, there is shown in FIG. 1 an Aging Container 10 for non-deleteriously accelerating the Wine aging process. The Aging Container 10 is a rectangular polyhedron of six sides wherein each side is a rectangle. The Aging Container 10 includes six semi-permeable walls, each having an exterior surface 12 and a corresponding interior surface within the Aging Container. One or more bung holes 14 allow ingress and egress of the Wine from the Aging Container 10. The semi-permeable rectangular front wall of large surface area 16, as better seen in FIG. 2, is identical to a rear semi-permeable rectangular wall of large surface area 18. Likewise, a semi-permeable rectangular side wall 20, as shown in FIG. 3, is identical to a second semi-permeable rectangular side wall (not shown), each of which have an exterior surface 12 and a corresponding interior surface within the Aging Container. Likewise, the semi-permeable rectangular top wall 22 having an exterior surface 12 and a corresponding interior surface within the Aging Container (FIG. 4) and the semi-permeable rectangular bottom wall 23 are identical and form opposing top and bottom semi-permeable rectangular walls of a width coincident with each of the semi-permeable rectangular side walls.

In operation, Wine is placed in the Aging Container 10 through one or more bung holes 14. The Aging Container 10 is "topped off" and sealed. Aging takes place within the Aging Container 10, naturally, without further processing, except occasional "topping off" as in conventional barrels. Because of the increased surface area within Aging Container 10, the Wine ages more quickly (for a given amount of wine) than in conventional aging barrels.

A ganged arrangement is shown in FIG. 5, wherein two Aging Containers 10, each identical to that shown in FIG. 1, are in a "side-by-side" relationship A rigid frame 24 for supporting the ganged Aging Containers 10 in a spaced apart relationship comprises rectangular support structures which support each Aging Container 10 along it outer edges as shown. The rigid frame 24 has dimensions substantially consistent with the exterior dimensions of the Aging Containers 10 and has one or more connecting lattice horizontal spacers 25.

Figure 7:
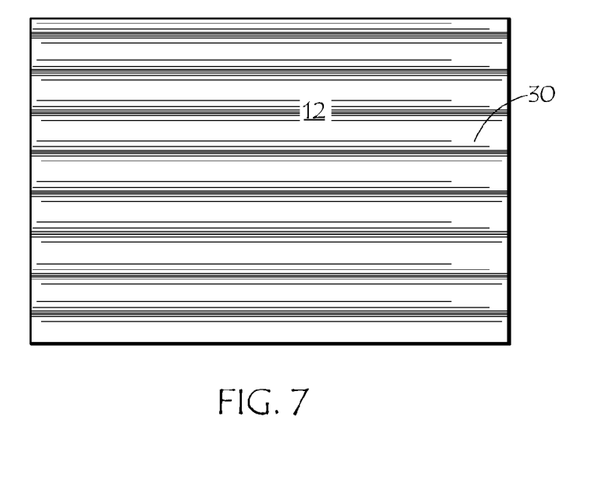
FIG. 7 is a front elevational view of the rectangular hexahedron shaped wine Aging Container of FIG. 6.
Figure 8:
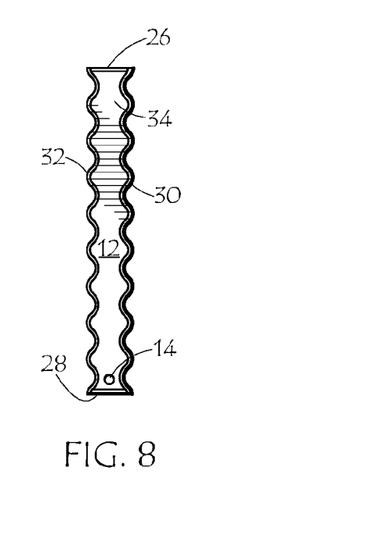
FIG. 8 is a side elevational view of the rectangular hexahedron shaped wine Aging Container of FIG. 6.

In another embodiment, as shown in FIG. 6, the Aging Container 10 has rectangular semi-permeable corrugated front wall 30 (FIG. 7) and a rectangular semi-permeable corrugated rear wall 32. This construction increases the exterior surface area 12 which increases the interior surface area of Aging Container 10. In addition, the corrugations in front and rear walls 30 and 32 increase the structural integrity of Aging Container 10 and provide for a serpentined semi-permeable side wall 34 as better seen in FIG. 8. The serpentine side walls structurally engage rectangular semi-permeable corrugated front and rear walls 30 and 32, as shown.

Figure 10:
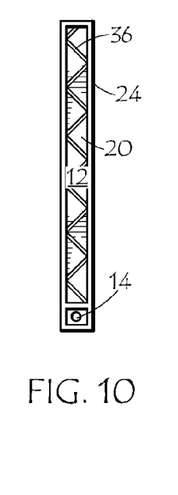
FIG. 10 is a side elevational view of the rectangular hexahedron shaped wine Aging Container of FIG. 9.
Figure 11:
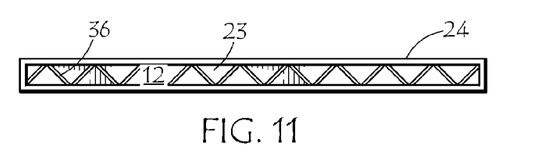
FIG. 11 is a bottom plan view of the rectangular hexahedron shaped wine Aging Container of FIG. 9.

In another embodiment, as shown in FIG. 9, Aging Container 10 is contained within rigid frame 24 as previously described. A cross-sectional lattice 36 is retained within rigid frame 24 and crisscrosses rectangular semi-permeable front wall 16, as well as rectangular semi-permeable rear wall 18 (not shown) in order to supply structural integrity to Aging Container 10. As better seen in FIG. 10, rectangular semi-permeable sides 20, are also contained within rigid frame 24 and retained by cross-sectional lattice 36 to support rectangular semi-permeable side walls 20. As shown in FIG. 11, rectangular semi-permeable bottom wall 23 is contained within rigid frame 24 and is retained by cross-sectional lattice 36.

Figure 13:
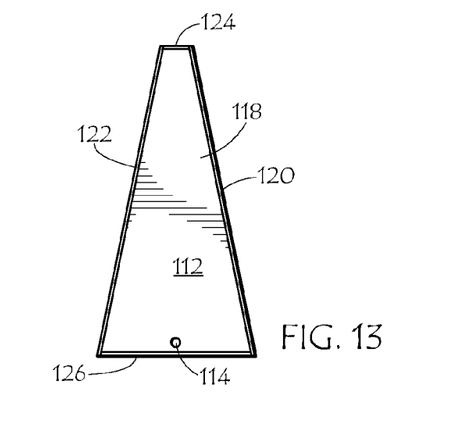
FIG. 13 a side elevational view of the trapezoidal hexahedron shaped wine Aging Container of FIG. 12.

Turning to FIG. 12, there is shown another embodiment of the Aging Container of the instant application. A trapezoidal hexahedral 100 has a rectangular semi-permeable front wall 120, a rectangular semi-permeable rear wall 122, a rectangular semi-permeable top wall 124, and a truncated triangular semi-permeable side wall 118 and, as better seen in FIG. 13, a rectangular semi-permeable bottom wall 126. In this embodiment, the trapezoidal hexahedral shape of the Aging Container 100 allows the Aging Container 100 to support itself on rails, shelves or the like without vertical structural support.

The foregoing descriptions of specific embodiments of the present invention are presented for the purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A wine aging container for the passive, enhanced aging of wine comprising: a polyhedron shaped vessel of a volume greater than 30 gallons formed of walls each of which is semi-permeable, and has straight edges and flat faces which define an interior surface area and an exterior surface area; wherein the relationship (ratio) of the interior surface area of the vessel to the volume of the vessel is from 0.33 square inches to 1.0 cubic inch, to 4.0 square inches to 1.0 cubic inch; and, wherein each of said walls are disposed between the wine within the vessel and the atmosphere surrounding the vessel such that the wine is in contact with the interior surface area of each wall and the atmosphere is in contact with the outer surface area of each wall such that oxygen from the atmosphere infuses through the semi-permeable walls to interact with and passively enhance the aging of the wine within the container.

2. The wine aging container of claim 1 wherein the polyhedron shape is a rectangular hexahedron.

3. The wine aging container of claim 1 wherein the polyhedron shape is a trapezoidal hexahedron.

4. The wine aging container of claim 1 wherein the volumetric capacity is equal to or greater than 60 gallons.

5. The wine aging container of claim 1 wherein the relationship (ratio) of the interior surface area to the volume is from 0.5 square inches to 1.0 cubic inch, to about 3.0 square inches to 1.0 cubic inch.

6. The wine aging container of claim 1 wherein said semi-permeable walls are selected from oak, sintered ceramics, semi-porous polymers, and sintered metal.

7. The wine aging container of claim 2 wherein at least one of the sides of the rectangular hexahedron are corrugated.

8. The wine aging container of claim 1 further comprising a rigid rectangular frame for providing support to the wine aging container.

9. The wine aging container of claim 8 further comprising a lattice cross-sectional support retained within the rigid rectangular frame for providing support to the wine aging container.

10. A wine aging container for the passive, enhanced aging of wine comprising: at least two rectangular polyhedron shaped vessels of a volume greater than 30 gallons formed of walls, each of which is semi-permeable, having straight edges and flat faces which define an interior surface area and an exterior surface area; wherein the relationship (ratio) of the interior surface area of the vessel to the volume of the vessel is from 0.33 square inches to 1.0 cubic inch, to 4.0 square inches to 1.0 cubic inch; and, wherein each of said walls are disposed between the wine within the vessel and the atmosphere surrounding the vessel such that the wine is in contact with the interior surface of each of said walls and the atmosphere is in contact with the outer surface of each of said walls such that oxygen from the atmosphere infuses through the semi-permeable walls to interact with and passively enhance the aging of the wine within the container.

11. The wine aging container of claim 10 wherein each rectangular hexahedron shaped wine aging vessel has a volumetric capacity equal to or greater than 60 gallons.

12. The wine aging container of claim 10 wherein each of said rectangular hexahedron shaped wine aging vessels has a relationship (ratio) of the interior surface area of the wine aging container to the volume of the container from 0.5 square inches to 1.0 cubic inch, to about 3.0 square inches to 1.0 cubic inch.

13. The wine aging container of claim 10 wherein each of said rectangular hexahedron shaped wine aging vessels has semi-permeable walls of a material selected from oak, sintered ceramics, semi-porous polymers, and sintered metal.

14. The wine aging container of claim 10 wherein at least one of said rectangular hexahedron shaped wine aging vessels has at least one corrugated wall.

15. The wine aging container of claim 10 wherein each of said at least one rectangular hexahedron shaped wine aging vessels further comprises a rigid rectangular frame for providing support to the wine aging container and at least two of said rigid rectangular frames are connected with at least one connecting lattice horizontal spacer.

16. The wine aging container of claim 10 wherein at least one rectangular hexahedron shaped wine aging vessel further comprises a lattice cross-sectional support retained within the rigid rectangular frame for providing support to the wine aging container.

* * * * *